(12) United States Patent
Saidi

(10) Patent No.: US 10,317,306 B2
(45) Date of Patent: Jun. 11, 2019

(54) SYSTEMS AND METHODS FOR DETECTING AND CONTROLLING LEAKS

(71) Applicant: Ali Saidi, Basking Ridge, NJ (US)

(72) Inventor: Ali Saidi, Basking Ridge, NJ (US)

( * ) Notice: Subject to any disclaimer, the term of this patent is extended or adjusted under 35 U.S.C. 154(b) by 0 days.

(21) Appl. No.: 15/467,171

(22) Filed: Mar. 23, 2017

(65) Prior Publication Data

US 2018/0275011 A1 Sep. 27, 2018

(51) Int. Cl.
*G01M 3/26* (2006.01)
*G05D 7/06* (2006.01)
*G05B 23/02* (2006.01)

(52) U.S. Cl.
CPC ........... *G01M 3/26* (2013.01); *G05B 23/0289* (2013.01); *G05D 7/0635* (2013.01)

(58) Field of Classification Search
CPC .... G01M 3/26; G05B 23/0289; G05D 7/0635
See application file for complete search history.

(56) References Cited

U.S. PATENT DOCUMENTS

| | | | |
|---|---|---|---|
| 6,526,807 B1 | 3/2003 | Doumit et al. | |
| 8,031,079 B2 | 10/2011 | Kates | |
| 8,922,379 B1 | 12/2014 | Meyer | |
| 2006/0031426 A1* | 2/2006 | Mesarina | G01D 21/00 709/220 |
| 2007/0229229 A1* | 10/2007 | Nelson | G01D 21/00 340/10.41 |
| 2009/0222541 A1* | 9/2009 | Monga | H04L 29/12113 709/222 |
| 2010/0188206 A1 | 7/2010 | Kates | |
| 2011/0311370 A1 | 12/2011 | Sloss et al. | |
| 2011/0320140 A1 | 12/2011 | Butler et al. | |
| 2014/0119947 A1 | 5/2014 | Bishop et al. | |
| 2014/0336821 A1* | 11/2014 | Blaine | A61H 33/005 700/275 |
| 2015/0330863 A1* | 11/2015 | Dotan | F17D 5/06 702/51 |
| 2016/0076909 A1* | 3/2016 | Klicpera | G06Q 50/06 73/198 |
| 2016/0219805 A1* | 8/2016 | Romney | A01G 25/16 |

(Continued)

FOREIGN PATENT DOCUMENTS

WO 2014066687 A2 5/2014
WO 2014151810 A1 9/2014

*Primary Examiner* — Vincent H Tran
(74) *Attorney, Agent, or Firm* — Rita C. Chipperson; Chipperson Law Group P.C.

(57) ABSTRACT

Systems and methods for detecting and controlling leaks via analysis of substance flow data. A leak management system including a processor that receives substance flow data from a plurality of substance flow sensors, analyzes the substance flow data to identify at least one discrepancy within said substance flow data, and transmits at least one alert and/or takes preventative or corrective action upon identification of said at least one discrepancy. In one aspect, identifying said at least one discrepancy includes identifying a predetermined difference between the value read at the primary one of the plurality of substance flow sensors and the sum of all values read at all of the secondary ones of the plurality of substance flow sensors, wherein the predetermined difference accounts for a margin of error. Flow sensors may be recharged by the flow of the substance through the sensor.

26 Claims, 6 Drawing Sheets

(56) References Cited

U.S. PATENT DOCUMENTS

| | | | | |
|---|---|---|---|---|
| 2016/0335875 A1* | 11/2016 | Alcorn | ............... | G01F 1/34 |
| 2017/0209338 A1* | 7/2017 | Potucek | ............... | A61H 33/005 |
| 2017/0322567 A1* | 11/2017 | Klein | ............... | G05D 7/0635 |

* cited by examiner

ND METHODS FOR DETECTING
SYSTEMS AND METHODS FOR DETECTING AND CONTROLLING LEAKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright whatsoever.

BACKGROUND OF THE INVENTION

Embodiments of the present invention generally relate to systems and methods for detecting and controlling leaks. More specifically, the present invention relates to systems and methods for detecting and controlling leaks via analysis of substance flow data.

Centralized water leak detection systems for detecting water leaks in residential and commercial buildings are known. These water leak detection systems may provide central station monitoring and point identification data for water leaks. The centralized water detection system may include a plurality of address modules connected to a plurality of sensors for assigning an address/identifier to each sensor. The address modules may be connected to a central control unit for processing detected sensor signals. A water alarm annunciator may be remotely installed in a central monitoring station for displaying point identification data showing location of detected water leaks.

Wireless sensor systems for providing an extended period of operability without maintenance are also known. These systems may include one or more intelligent sensor units and a base unit that can communicate with a large number of sensors. When one or more of the sensors detects an anomalous condition (e.g., smoke, fire, water, etc.), the sensor communicates with the base unit and provides data regarding the anomalous condition. The base unit can contact a supervisor or other responsible person via a plurality of methods, such as, telephone, pager, cellular telephone, Internet, etc. In one embodiment, one or more wireless repeaters are used between the sensors and the base unit to extend the range of the system and to allow the base unit to communicate with a large number of sensors.

Systems and methods for automatically detecting unwanted continuous flow of water or other liquids, either from intentional use or from a leak in the faucet/plumbing system are also known. Systems and methods are also known for automatically turning off the water faucet or dispensing apparatus when unwanted flow conditions are detected to prevent water from being wasted, overflowing and/or causing property damage.

Systems and methods for sump pump remote monitoring are also known. These systems and methods can include control circuitry integrated into a portable housing with a backup sump pump connected to the control circuitry. The control circuitry can be powered by line power and when line power is not available, the control circuitry can be powered by battery power. The control circuitry can be connected to a control panel, and the control circuitry can include a pressure transducer to measure a pressure in a fluid level sensor. Based on the measured pressure, the control circuitry can adjust the speed of the backup sump pump. A wireless controller can be connected to the control circuitry to wirelessly receive monitoring instructions and wirelessly transmit backup sump pump status data, with the control circuitry providing an indication of the backup sump pump status data to the control panel.

BRIEF SUMMARY OF THE INVENTION

In one aspect of the present invention, a leak management system is provided. The leak management system includes: a plurality of substance flow sensors coupled to or in communication with the distribution system; at least one processor coupled to or in communication with the plurality of substance flow sensors; at least one memory coupled to or in communication with the at least one processor; at least one user interface coupled to or in communication with the at least one processor; a primary power supply coupled to or in communication with the at least one processor; processor executable instructions configured to be executed by the at least one processor and stored in the at least one memory, the processor executable instructions including instructions for: receiving substance flow data from the plurality of substance flow sensors; analyzing the substance flow data to identify at least one discrepancy within the substance flow data; and transmitting alerts upon identification of the at least one discrepancy.

In another aspect of the present invention, a leak management system for a substance flowing in a distribution system is disclosed. The system includes: a plurality of water flow sensors coupled to or in communication with the substance distribution system; at least one processor coupled to or in communication with the plurality of water flow sensors; at least one memory coupled to or in communication with the at least one processor; at least one user interface coupled to or in communication with the at least one processor; a primary power supply coupled to or in communication with the at least one processor; a substance flow shutoff attached to the substance distribution system and coupled to or in communication with the at least one processor; processor executable instructions configured to be executed by the at least one processor and stored in the at least one memory, the processor executable instructions including instructions for: discovering the plurality of substance flow sensors; monitoring operational status signals transmitted by each of the plurality of substance flow sensors; receiving substance flow data from the plurality of substance flow sensors; analyzing the substance flow data to identify at least one discrepancy; transmitting an alert upon identification of the at least one discrepancy; and activating the substance flow shutoff upon identification of the at least one discrepancy.

In yet another aspect of the present invention, a method for managing leaks in a substance distribution system is provided. The method includes the steps of: discovering a plurality of substance flow sensors coupled to or in communication with the distribution system; monitoring operational status signals transmitted by each of the plurality of substance flow sensors; receiving substance flow data from the plurality of substance flow sensors; analyzing the substance flow data to identify at least one discrepancy; transmitting at least one alert upon identification of the at least one discrepancy; and activating a water flow shutoff attached to the distribution system upon identification of the at least one discrepancy.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
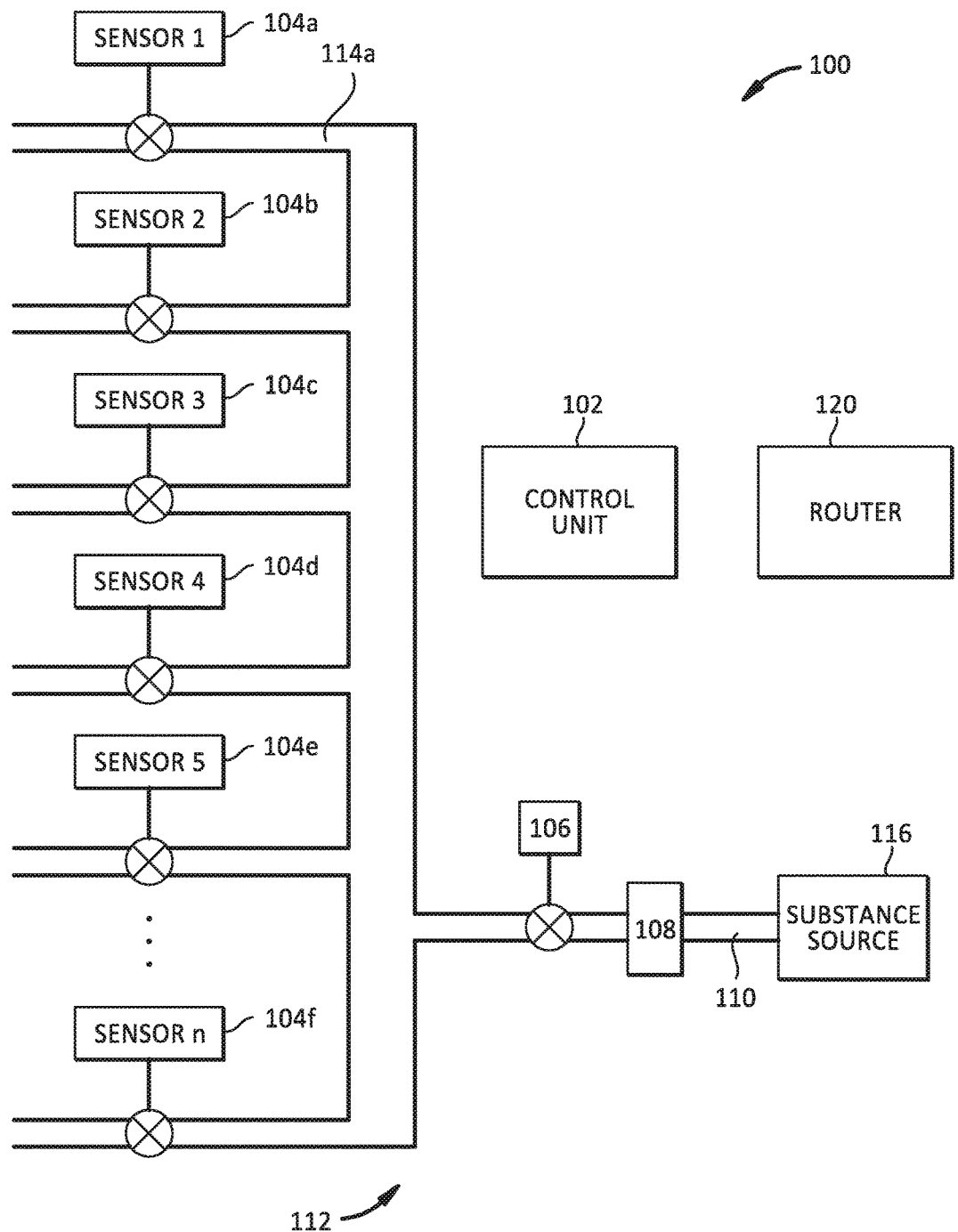
FIG. 1 is a schematic view of a system for detecting and controlling leaks in accordance with one embodiment of the present invention.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Furthermore, the subject application references certain processes which are presented as series of ordered steps. It should be understood that the steps described with respect to those processes are not to be understood as enumerated consecutive lists but could be performed in various orders while still embodying the invention described herein.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a sensor" may include a plurality of sensors. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Referring first to FIG. 1, depicted is a schematic view of a system 100 for detecting and controlling leaks in accordance with one embodiment of the present invention. In the depicted embodiment of the present invention, system 100 is installed on a substance distribution system 112 having a main supply channel 110 and a plurality of branch channels 114. The main supply channel 110 is fed by substance source 116. Also in the depicted embodiment, system 100 includes a control unit 102, a plurality of secondary substance flow sensors 104a through 104f, a primary substance flow sensor 106, and a substance flow shutoff 108.

In one application of the present invention, system 100 is a system for detecting and controlling water leaks that occur in a building such as, but not limited to, a residential home, commercial office space, industrial facility, etc. However, the present invention is not limited to the detection of water or any specific type of facility.

In one application of the present invention, system 100 is installed, for example, on a water distribution system 112 that supplies a residential home with water, wherein the water distribution system 112 may be fed by a substance (water) source such as, but not limited to, a residential well system or a public water reservoir piped to the residential home through a town or city-wide supply piping system. In such a scenario, the main supply channel 110 is the piping, or a portion thereof, that extends from the substance source 116 through the residence up until a first water main branch. A water main branch, or branch supply channel, is a pipe that extends from the main supply channel to a specific water fixture or group of fixtures. For example, in a typical home, the main supply channel 110 may be a 2" diameter water line that supplies water to the home. This 2" exemplary main supply channel may then connect to a plurality of branch supply channels 114 having smaller diameters such as ½", ¾", etc., which extend as needed to water fixtures or groups of water fixtures such as sinks, toilets, washing machines, showers, bathtubs, and the like. The branch lines may be singular, i.e., one per fixture, or they may be grouped, e.g., one branch supply line to supply all fixtures in a half bath or the like.

In an application in which system 100 is to be applied to a residential home for the purpose of water leak detection and control, one or more substance flow shutoffs 108 are installed in main supply channel 110 to allow substance flow shutoff(s) 108 to shutoff water flow through distribution system 112 upon the shutoff 108 being indexed to a closed position. One or more primary substance flow sensors 106 are also installed in main supply channel 110 in order to sense the total water flow entering the home from the substance source 116. Although only one substance flow shutoff 108 and one primary substance flow sensor 106 is required to achieve the purposes of the present invention, one or more additional shutoffs 108 and/or primary substance flow sensors may be installed to serve as a backup if the primary shutoff or substance flow sensor, respectively, fails. In the depicted embodiment, the shutoff valve has model no. DFD50 as manufactured by Yuyao, however, alternate valves may be substituted without departing from the scope hereof. Also, in the depicted exemplary embodiment of the present invention, substance flow shutoff 108 may communicate via a wireless or wired connection with control unit 102, wherein the connection allows control unit 102 to open and close, or modulate, substance flow shutoff 108 from an open to a closed position and vice versa.

Additionally, at least one secondary substance flow sensor 104 is installed in each of the branch channels. The secondary substance flow sensors sense the flow of water passing through the respective branch channel and report the value as substance flow data to the control unit. In the depicted exemplary embodiment of the present invention, sensor 104 may communicate via a wireless or wired connection with control unit 102. Also, sensor 104 includes a rechargeable power supply that is recharged based upon the flow of the substance through the branch which flow is being monitored by the respective sensor. Further, sensor 104 is programmed to sleep when it does not have data to report and to wake only when required for heart beat or sanity checks.

Figure 2A:
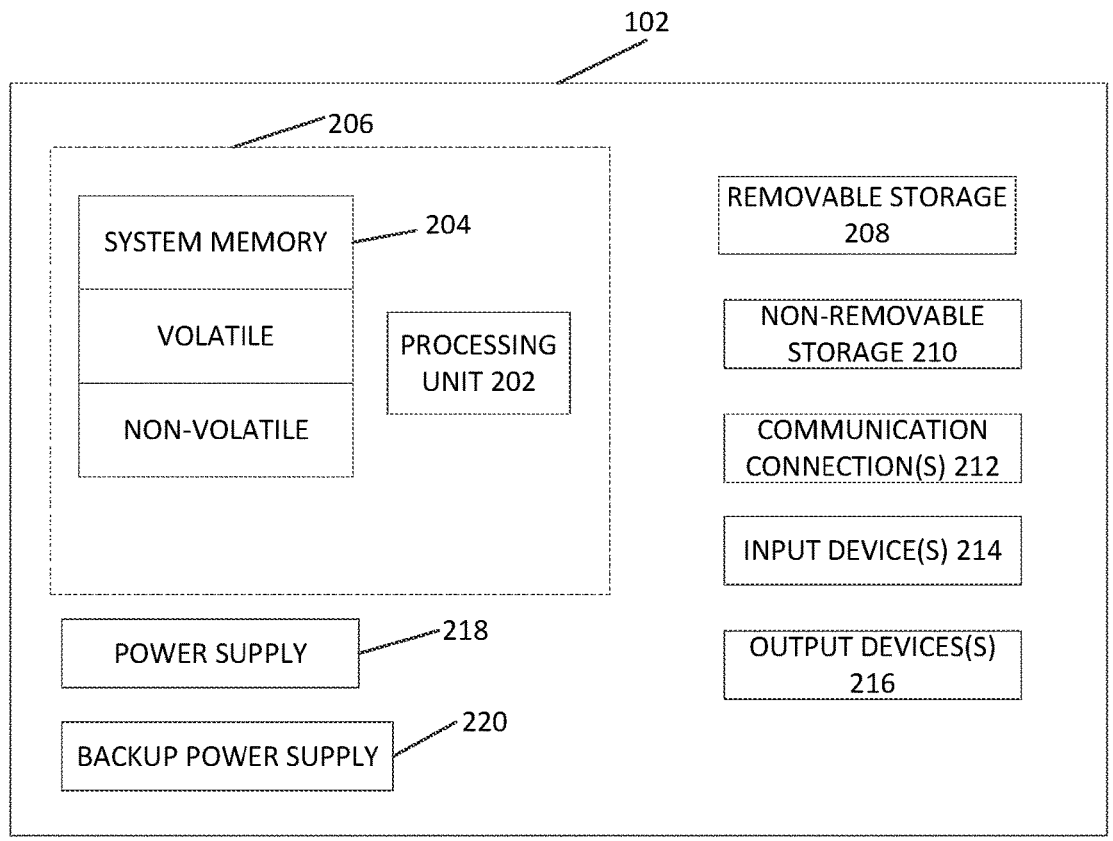
FIG. 2A depicts a block diagram of an exemplary control unit in accordance with one embodiment of the present invention.

As also shown in FIG. 1, system 100 includes a control unit 102. In its most basic configuration, as depicted in FIG. 2A, control unit or computing device 102 includes at least one processing unit 202 (or processor) and at least one memory 204 operatively coupled thereto. The processing unit and memory may be tangible elements in a computing device. Or, they may be virtualized, for example as elements of a virtual machine hosted in a so-called computing cloud. Moreover, depending on the exact configuration and type of the computing device, memory 204 may be volatile (such as random access memory ("RAM")), non-volatile (such as read-only memory ("ROM"), flash memory, etc.), or some combination of the two. This most basic configuration is illustrated in FIG. 2A by dashed lines 206. In the depicted exemplary embodiment of the present invention, processing unit 202 is an ARM7TDMI-S processor as manufactured by ARM Limited, however, alternate processors may be substituted without departing from the scope hereof. The depicted exemplary embodiment also incorporates a 512 Mb M29EW flash embedded memory and a 200 MHz MT46H16M32LF SDRAM, both manufactured by Micron Technology, Inc., however, alternate memories may be substituted without departing from the scope hereof.

Computing device may be powered by a power supply 218 such as, for example, a MAX1792 Low Dropout Linear Regulator as manufactured by Maxim Integrated, however, alternate power supplies may be substituted without departing from the scope hereof. In the exemplary embodiment of the present invention, the power consumption of the system is designed to be less than 3 W to allow operation with backup power supply 220 (e.g., a battery backup) in case of a power outage. The system is designed for 10 hour of backup power supply operation. The control unit 102 of the depicted embodiment incorporates an Advanced RISC Machine ("ARM") architecture that is optimized for power.

Computing device 102 may have additional features/functionality. For example, computing device 102 may include additional storage (removable and/or non-removable) including, but not limited to, magnetic or optical disks or tape, thumb drives, and external hard drives as applicable. Such additional storage is illustrated in FIG. 2A by removable storage 208 and non-removable storage 210.

Computing device 102 typically includes or is provided with a variety of computer-readable media. Computer-readable media can be any available media that can be accessed by computing device 102 and may be any type of non-volatile media, and removable and non-removable media. Memory 204, removable storage 208, and non-removable storage 210 are all examples of computer storage media. Computer storage media may include, but is not limited to, RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can accessed by control unit 102. Any such computer storage media may be part of control unit 102 as applicable.

Computing device 102 may also contain communications connection 212, such as a wired interface or a wireless air interface that allows the device to communicate with other devices. Such communications connection 212 is an example of communication media. Communication media typically conveys computer-readable instructions, data structures, program modules and/or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as radio frequency ("RF"), infrared, and other wireless media. The term computer-readable media as used herein includes both storage media and communication media. The depicted exemplary embodiment includes an RS9110 Self-Contained 802.11 b/g/n Module with Networking Stack as manufactured by Redpine Signals to facilitate wireless communication, however, alternate wireless modules may be substituted without departing from the scope hereof. However, control unit 102 shall accommodate both wired and wireless network connections although both types of connections are not required to implement the present invention.

Optionally, an external diversity antenna may be coupled to or integral to control unit 102 to enhance the communication range of the system.

Computing device 102 may also have input device(s) 214 such as keyboard, mouse, pen, voice input device, touch screen, etc. Output device(s) 216 such as a graphical display, speakers, printer, etc. may also be included. These devices alone, or in combination with other components, may be collectively referred to herein as a user interface and are well known and may not be discussed in further detail herein if it does not clarify the description. These input and output devices allow the user to interact with the system in order to perform actions such as, but not limited to, configuration of an alarm profile, editing or initial entry of system sensors, recognizing alarms, etc.

Figure 2B:
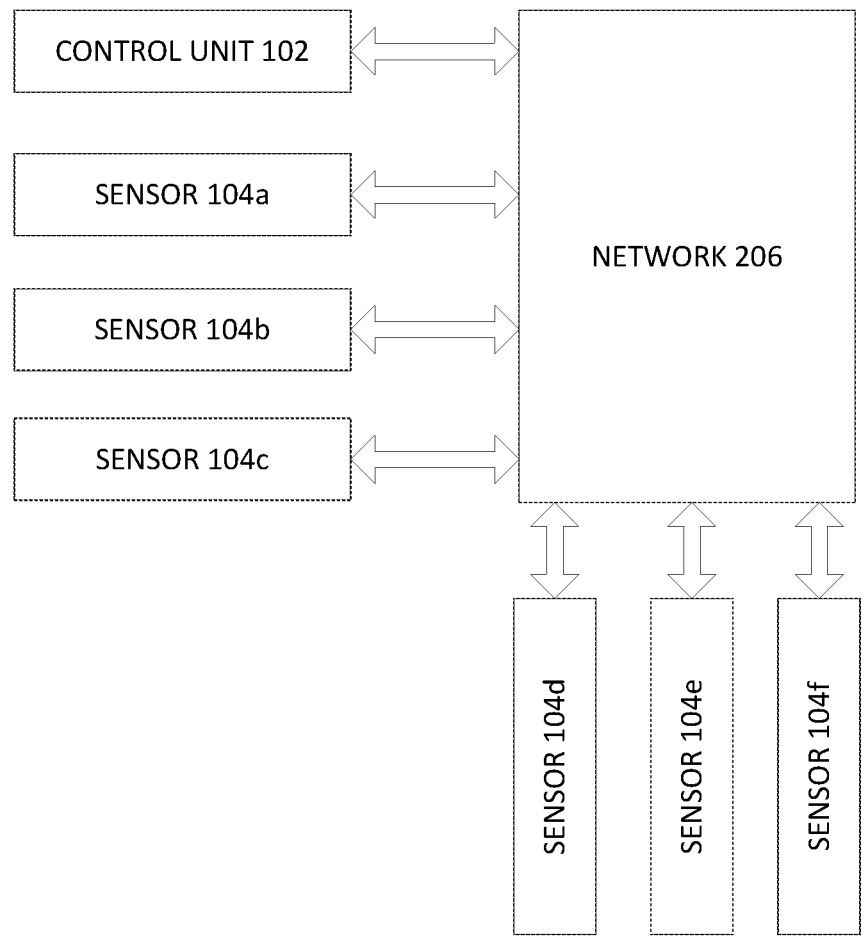
FIG. 2B depicts a schematic view of an exemplary network environment in which various embodiments may be practiced.

As shown in FIG. 2B, control unit 102 may be interconnected with one or more sensors 104 via network 206. Sensors 104 may be connected to network 206 via a wired or wireless connection, or a hybrid thereof. As may be appreciated, network 206 may be any appropriate network and control unit 102 may be connected thereto by way of connection 212 in any appropriate manner, and each sensor 104 may communicate with one or more of control unit 102 and the other sensors 104 via network 206 in any appropriate manner. For example, network 206 may be a wired network, wireless network, or a combination thereof within an organization or home or the like, and may include a direct or indirect coupling to an external network such as the Internet, a cellular network (e.g., GPRS), and/or the like. Likewise, network 206 may be such an external network including, without limitation, the Internet or a cellular network.

In the exemplary embodiment of the invention depicted in FIG. 2B, the control unit primarily communicates with sensors 104 via a private local area network which may be controlled by a router such as router 120 (FIG. 1), however, the functions of router 120 may also be automatically incorporated into control unit 102 without departing from the scope hereof. Router 120 facilitates communication with all networked devices as is known in the art.

In the depicted exemplary invention, network 206 is a private, wireless or wired local area network with an Internet interface. Wireless local area networks may be, for example, WiFi or cellular. This allows the sensors and control unit to communicate independently of the Internet under normal operation, however, the Internet interface allows the control unit 102 to transmit alarms such as email alarms, SMS alarms, and the like as discussed in greater detail herein.

Also, in the depicted embodiment, control unit 102 and sensors 104 are equipped to utilize the Internet for backup operation if the primary local area network is not operational. Also, the system supports rate matching for users with systems having very low bandwidth or users who have a limited amount of data usage per month. The system will adjust the data rate based on the available bandwidth and critical alerts will be transmitted prior to services that have lower priority.

Furthermore, in the depicted exemplary embodiment, control unit 102 and each of the sensors 104 has the ability to automatically discover all sensors within the coverage range. Information sensed by the sensors 104 will be communicated to the control unit 102, which will automatically compile a list of sensors for review by the user as discussed in greater detail herein. If a sensor does not respond to a communication from control unit 102, the user will be notified of the sensor(s) that are not responding. Failure of a sensor to communicate may occur, for example, if the hardware or battery of a sensor fails or if the sensor is placed in a poor location in which it is not able to communicate wirelessly with control unit 102. In the case of poor sensor placement, one or more repeaters may be utilized to increase the signal strength to allow such sensor to communicate properly.

Figure 4:
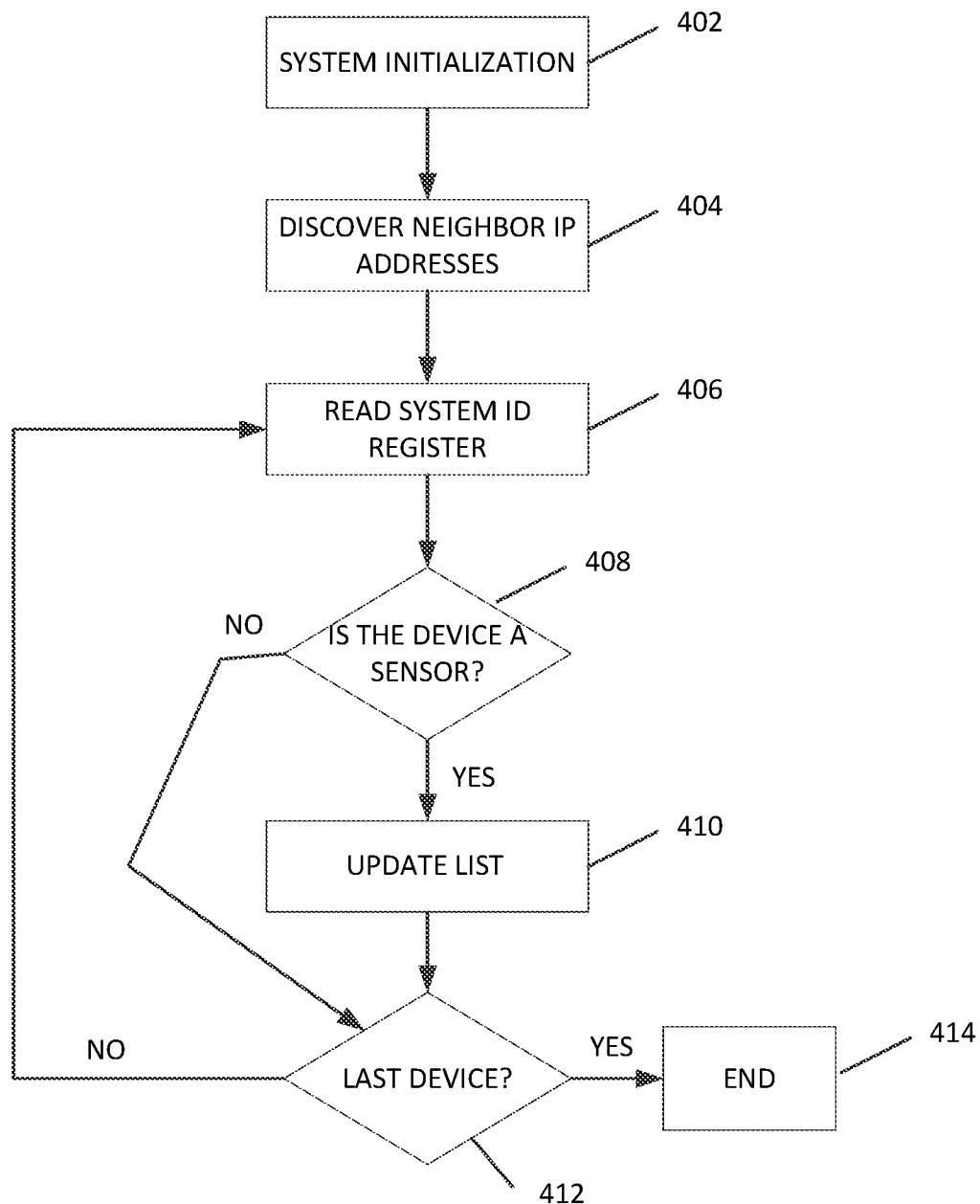
FIG. 4 is a flowchart of one method of discovering sensors in accordance with one embodiment of the present invention.

Referring now to FIG. 4, depicted is an exemplary process 400 executed by an exemplary control unit 102 in accordance with the present invention. Process 400 begins at 402, at which the control unit 102 is powered on or initialized. Next, process 400 proceeds to 404 at which it discovers the IP addresses of its neighbors (i.e., all devices in the system) via a neighbor scan. All discovered devices are compiled into a neighboring device list. That is, in the depicted embodiment of the present invention, all sensors 104 have a dedicated WiFi modem and IP address that allows it to establish a connection with control unit 102 via a main WiFi router. The main control transmits pings to each sensor 104 to verify that the sensor is operating and calibrated as per factory settings. Control unit 102 also receives a report from each sensor 104 detailing the results of the sensor's boot up self test. Although the sensors of the depicted embodiment communicate wirelessly, alternate embodiments are envisioned in which the sensors communicated via a wired network.

Process 400 then proceeds to 406, at which the IP address of the first discovered device on the list is compared to the System ID register. The System ID register includes information for all devices in the system including each device's type (e.g., sensor) and IP address.

At step 408, process 400 queries the System ID register to determine whether the discovered device is a sensor. If yes, process 400 proceeds to step 410 at which the controller's list of neighboring devices is updated to include the information of the current sensor. Then process 400 proceeds to 412. Step 412 will also be reached if the device is not a sensor at 408. At 412, process 400 queries whether the last processed device is the last device on the list of discovered devices (i.e., the devices discovered at step 404). If no, process 400 returns to 406, and steps 406 through 412 are repeated as discussed above. If the device is the last device on the list, process 400 proceeds to 414, at which it ends.

The various techniques, approaches, and methods described herein may be implemented in connection with hardware, or as a combination of hardware and software. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, or any other machine-readable storage medium wherein. When the program code is accessed and executed by a processor in a machine, such as a computer, the machine becomes an apparatus for practicing the presently disclosed subject matter.

In the case of program code execution on programmable computers, the computing device 102 generally includes a processor, a storage medium readable by the processor (including volatile and non-volatile memory and/or storage elements), at least one input device, and at least one output device. One or more programs may implement or utilize the processes described in connection with the presently disclosed subject matter, for example, through the use of an application-program interface ("API"), reusable controls, or the like. Such programs may be implemented in a high-level procedural or object-oriented programming language. However, the applications and other programs described herein may be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment such as, for example, a distributed computing environment. Still further, aspects of the presently disclosed subject matter may be implemented in or across a plurality of processing chips or devices, and storage may similarly be effected across a plurality of devices. Such devices might include personal computers, network servers, and handheld devices (e.g., cell phones, tablets, smartphones, etc.), for example.

FIG. 2B depicts one exemplary networked computing environment in which the invention may be practiced. The depicted computing environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers ("PCs"), server computers, handheld or laptop devices, multi-processor systems, microprocessor-based systems, network PC's, minicomputers, mainframe computers, cell phones, tablets, embedded systems, distributed computing environments that include any of the above systems or devices, and the like.

The embodiments may include computer-executable instructions, such as program modules stored in a storage device and executed by a computing processor operatively coupled to the storage device. Generally, program modules include routines, programs, objects, components, data structures, etc. that perform particular tasks or implement particular data types. Distributed computing environments may be used where tasks are performed by remote processing devices that are linked through a communications network or other data transmission medium. In a distributed computing environment, program modules and other data may be located in both local and remote computer storage media including memory storage devices.

Figure 3A:
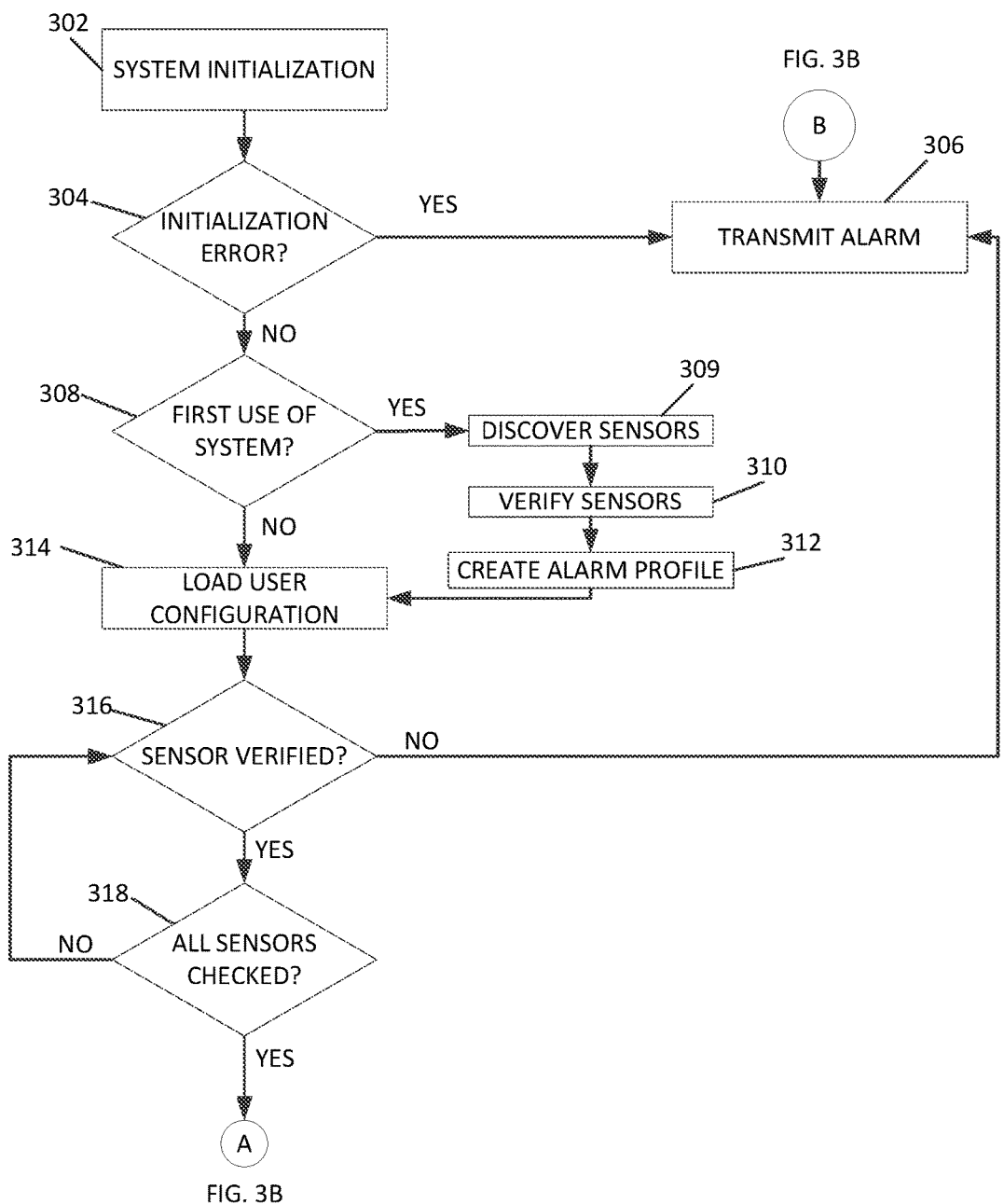
FIGS. 3A and 3B are flowcharts of one method of detecting and controlling a leak in accordance with one embodiment of the present invention.
Figure 3B:
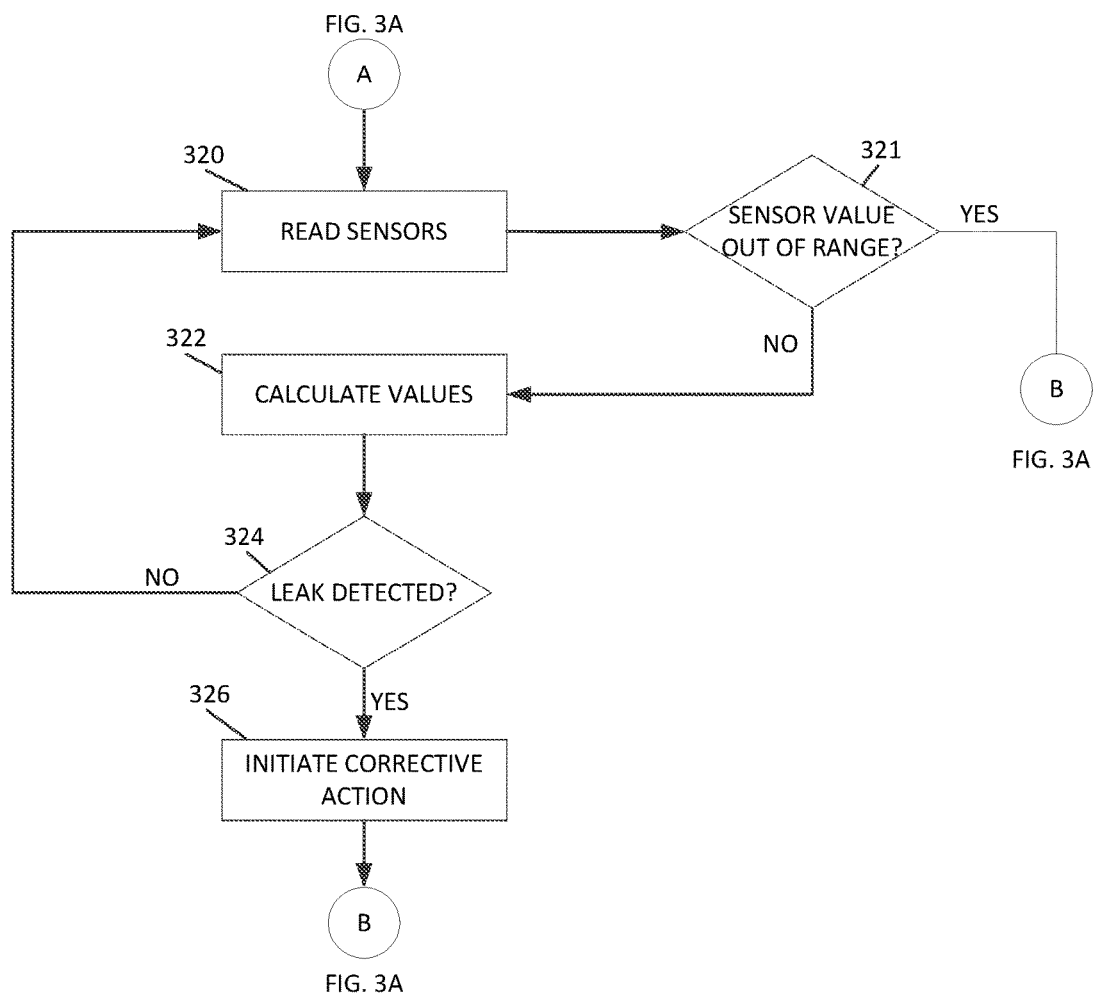

Referring now to FIGS. 3A and 3B, depicted are flowcharts of one method of detecting and controlling a leak in accordance with one embodiment of the present invention. FIG. 3A depicts a flowchart of the process 300 that occurs when an exemplary system such as system 100 (FIG. 1) is energized. Process 300 starts at 302, at which system initialization occurs. In the depicted embodiment, system initialization begins with a boot code authentication in which the signature associated with the boot code, as is typically stored in flash memory, is validated against the non-volatile code stored in a permanent memory such as removable or non-removable storage 208 and 210, respectively. This validation ensures that the boot code is authentic and can be executed by the processing unit such as processing unit 202.

After validation of the boot code, the boot code is executed by the processing unit. In the exemplary embodiment, the boot code verifies that key system components are working properly and pass sanity tests. Such components may include, but are not limited to, the wireless network system and the backhaul system. For the wireless network system, the boot code will ensure that communication is established between the wireless router such as wireless router 102 and the control unit such as control 102. This check further ensures that an IP address can be assigned to the control unit.

The backhaul system is also tested to ensure that communications may be sent outside of system 100 such as, for example, a leak detected alarm sent to an owner of the system or other responsible party. In the depicted embodiment, such communications are sent via the Internet; however, alternate embodiments may be substituted.

If, at 304, an error has been detected with the boot code or a key system component, process 300 proceeds to 306 at which an alarm is generated and transmitted to the system user. If the system is being setup for the first time and a user profile has not yet been created (as discussed in greater detail below), this alarm may be simply a local alarm such as a visual alarm (e.g., an illuminated lamp or a display of an error message on a display associated with the control unit), an audible alarm (e.g., a horn), or the like. For example, an alarm lamp and horn may be contained in the same enclosure as the control unit such as control unit 102. However, such alarms may also be remotely located without departing from the scope hereof.

If, at 306, a user profile has been established, the alarm may specifically contact the user. For example, process 300 may transmit a pre-programmed message via SMS, email, telephone, wherein the message is designed to alert the user as to the specific nature of the alarm that has occurred. Alarms may include one or more of, but are not limited to, system initialization failure, sensor failure, boot code failure, hardware failure, and leak detection.

If, at 304, a system initialization error is not detected, process 300 proceeds to 308, at which it determines if the system is being used for the first time. If yes, process 300 proceeds to 309, at which the sensors are discovered. In the depicted embodiment, the sensors are discovered via network 206 (wired, wireless, or hybrid) and sensors may be discovered by control unit 102 via a process such as process 400 as discussed in greater detail herein. The data regarding the discovered sensors is compiled into list format by the control unit 102 for presentation to the user. This list may include information for each sensor that includes, but is not limited to, sensor serial number, pipe gauge of the sensor, and sensor type, sensor maximum flow rate (which may be calculated), Next, process 300 proceeds to 310, at which the quantity of sensors being monitored and, optionally, other sensor data will be verified. In the depicted embodiment of the present invention, the sensors to be monitored may be displayed to the user in list format and options may be made available to edit the list if there is a discrepancy between the actual quantity of sensors installed and those in the list. That is, the user may input sensor list data to the processor via, for example, the control unit user interface or other local or remote interface (e.g., a remote web-based interface). Optionally, each of the sensors may be displayed with sensor information associated with the respective sensor including, without limitation: sensor flow range; operational status; and an address that may be assigned to it via a router or the like such as router 120 (FIG. 1).

After the listed sensors are verified and/or corrected, if needed, process 300 proceeds to 312, at which an alarm profile is created. This profile may include, for example, whether or not preventative or corrective actions should be taken upon detection of an alarm as well as what type of actions should be taken. For the former, a user can choose yes or no as to whether to take preventative or corrective action upon alarm detection. If the user chooses yes, the type of corrective action to be taken may be selected. For example, the preventative or corrective action may include activating a substance flow shutoff such as substance flow shutoff 108 to isolate the substance source such as substance source 116. That is, the user may input preventative action data to the processor via, for example, the control unit user interface or other local or remote interface.

Additionally, the alarm profile allows the user to select options for alerting the user upon detection of an alarm. For example, a user may choose to have a pre-programmed message sent to the user via SMS, email, telephone, wherein the message is designed to alert the user as to the specific nature of the alarm that has occurred. In such a scenario, the user will enter his or her contact information as part of step 312 including, without limitation, cell phone number, email address, etc. And the user may indicate the type of notification he or she wishes to receive based upon the type of alarm that occurs (e.g., system initialization failure, sensor failure, boot code failure, hardware failure, and leak detection). That is, the user may input alerting option data to the processor via, for example, the control unit user interface or other local or remote interface.

Once an alarm profile has been created, process 300 proceeds to 314, at which the user configuration is loaded. This user configuration includes, but is not limited to, the list of verified sensors and the user's alarm profile as discussed above.

Next, at 316, a first sensor is verified. In the depicted embodiment, sensor verification includes checking that the control unit has received the sensor heartbeat from the respective sensor in accordance with its pre-defined interval. If a heartbeat was not detected in accordance with the pre-defined interval, process 300 proceeds to 306, at which an alarm is transmitted to the user. The type of alarm to be sent or displayed will be such as specified in the configuration of the alarm profile as discussed above. If a pre-programmed error message is sent to the user, such message may include the address of the sensor and/or other identifying information. In some embodiments of the invention, the user may specify what information is to be included in the pre-programmed message. Alternatively, the user may select from a pre-written list of such messages. Also, in the depicted embodiment, upon detection of an alarm, the system enters a halt mode in which no further action is taken until input is received from a user. For example, the user may investigate and remedy the sensor in alarm via troubleshooting and/or replacement of the sensor. When the problem is rectified, the user may provide input to the control unit to indicate that the system may resume operation. In such a scenario, process 300 will restart at step 302 as described herein. The halt mode is optional but may be entered to ensure that the substance flow shutoff 206 is not activated due to a faulty sensor 104 (rather than a water leak).

Alternatively, if at 316, the sensor is verified, process 300 proceeds to 318, at which it determines whether all sensors have been checked and/or verified. If no, process 300 returns to 316 and verifies the next sensor. If all sensors have been checked and/or verified, process 300 proceeds to 320 (FIG. 3B). At 320, flow values are read for all of the substance flow sensors including the primary and secondary substance flow sensors. As described above, sensors will generate heartbeats for reading by the control unit 102 on a pre-defined time basis to allow the control unit 102 to verity that the sensors are operational. However, in order to preserve battery life, sensors 104 will only send flow data when flow is detected. Otherwise, control unit 102 will assume that there is no flow at the respective sensor 104. However, alternate embodiments of the present invention are envisioned in which flow rates are continuously transmitted. In the depicted embodiment, flow data received from the sensors 104 is recorded and archived at control unit 102 to allow a user to view historical flow data for a predetermined time period that may be set by a user. However, alternate embodiments are envisioned in which flow data is not archived and/or able to be retrieved by the system user.

After all sensors have been read, process 300 proceeds to 321, at which a sanity check is performed. That is, the sensor value is read to determine whether the value is in a range of possible correct values (i.e., between zero and the maximum flow available for the channel being monitored by the respective sensor). If the value is not within a permissible range, process 300 proceeds to 306 at which an alarm is transmitted to the user as described in greater detail herein. The alarm may indicate to the user which sensor is not reading a value within its range.

If the read sensor value is in range, process 300 proceeds to 322, at which a leak detection calculation is performed. In the depicted embodiment, this calculation includes summing all of the values read from the secondary substance flow sensors and comparing this sum to the value of the primary flow sensor. If the difference between the sum and the primary flow sensor value exceeds a predetermined margin of error (i.e., a discrepancy is detected), process 300 determines that a leak has occurred. For example, the predetermined margin of error may be two percent, however, alternate margins may be substituted without departing from the scope hereof. This is one method of a calculation for determining that a leak has occurred, but others may be substituted without departing from the scope hereof.

If, at 324, a leak has not occurred, process 300 proceeds to 320 at which it repeats step 320 and 322 continuously. If, at 324, a leak has been detected, then process 326 proceeds to which corrective action may be initiated. As described in greater detail above, this corrective action will only be taken if selected by the user during setup of the user's alarm profile. And the type of action taken will also be as selected by the user therein.

Next, process 300 proceeds to 306 (FIG. 3A), at which an alarm may be transmitted to the user. As described in greater detail above, an alarm will only be transmitted if selected by the user during setup of the user's alarm profile. And the type of action taken will also be as selected by the user therein. In the depicted embodiment, after transmission of the alarm at step 306, the system will cease operation until input is received from the user. However, alternate embodiments are envisioned in which the system does not cease operation. Also, although FIGS. 3A and 3B depict step 306 occurring after 326, these steps may be performed simultaneously or in reverse order without departing from the scope hereof.

Although several processes have been disclosed herein as software, it may be appreciated by one of skill in the art that the same processes, functions, etc. may be performed via hardware or a combination of hardware and software. Similarly, although the present invention has been depicted as a hardwired system, these concepts may be applied to wireless systems and hybrid hardwired and wireless systems without departing from the scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A leak management system for a substance flowing in a substance distribution system, comprising:
   a plurality of substance flow sensors coupled to or in communication with said distribution system;
   at least one processor coupled to or in communication with said plurality of substance flow sensors;
   at least one memory coupled to or in communication with said at least one processor;
   at least one user interface coupled to or in communication with said at least one processor;
   a primary power supply coupled to or in communication with said at least one processor;
   processor executable instructions configured to be executed by said at least one processor and stored in said at least one memory, the processor executable instructions including:
      discovering said plurality of substance flow sensors;
      receiving substance flow data from said plurality of substance flow sensors;
      analyzing said substance flow data to identify at least one discrepancy within said substance flow data; and
      transmitting alerts upon identification of said at least one discrepancy;
   wherein discovering said plurality of substance flow sensors includes the steps of:
      discovering IP addresses of devices in the leak management system;
      compiling a list of the IP addresses;
      comparing each of the IP addresses to a register to obtain device information, the device information including whether the device associated with the IP address is a sensor device or a non-sensor device; and
      updating the list with the device information.

2. The leak management system according to claim 1, wherein the substance distribution system includes a main supply channel and a plurality of branch channels;
   wherein said main supply channel is coupled to a primary one of said plurality of substance flow sensors; and
   wherein each of said plurality of branch channels is coupled to secondary ones of said plurality of substance flow sensors; and
   wherein said identifying said at least one discrepancy includes identifying a predetermined difference between the value read at the primary one of said plurality of substance flow sensors and the sum of all values read at all of the secondary ones of said plurality of substance flow sensors.

3. The leak management system according to claim 2, wherein said predetermined difference accounts for a predetermined margin of error.

4. The leak management system according to claim 2, further comprising a substance flow shutoff attached to said main supply channel and coupled to or in communication with said at least one processor.

5. The leak management system according to claim 1, said processor executable instructions further comprising instructions for:
receiving from said user interface at least one of the group consisting of alerting option data, preventive action data, and combinations thereof.

6. The leak management system according to claim 1, said processor executable instructions further including instructions for:
discovering a flow range for each of said plurality of substance flow sensors.

7. The leak management system according to claim 6, said processor executable instructions further including instructions for:
providing said flow range to a user of said leak management system via said at least one user interface.

8. The leak management system according to claim 1, said processor executable instructions further including instructions for:
monitoring at least one of the group consisting of sanity, heartbeat, and
combinations thereof for each of said plurality of substance flow sensors.

9. The leak management system according to claim 6, said instructions further comprising instructions for:
recording said operational status of at least one of said plurality of substance flow sensors for retrieval by a user.

10. The leak management system according to claim 1, said instructions further comprising instructions for at least one of the group consisting of: determining operational status of the at least one processor, the at least one memory, and the at least one user interface; verifying the integrity of the processor executable instructions; transmitting to a system user the operational status and the integrity of the processor executable instructions; and combinations thereof.

11. The leak management system according to claim 1, further comprising:
a backup power supply for use upon failure of said primary power supply;
said instructions further comprising instructions for:
determining an operational status of said backup power supply; and
transmitting or displaying the operational status of said backup power supply to a user.

12. The leak management system according to claim 1, further comprising:
a substance flow shutoff attached to said substance distribution system and coupled to or in communication with said at least one processor.

13. The leak management system according to claim 12, said instructions further comprising instructions for:
activating said substance flow shutoff upon identification of said at least one discrepancy.

14. The leak management system according to claim 1, wherein at least one of said plurality of substance flow sensors includes a rechargeable power supply, said rechargeable power supply recharged by a flow of said substance.

15. The leak management system according to claim 1, wherein at least one of the group consisting of said plurality of substance flow sensors, said at least one processor, said at least one memory, said at least one user interface, and combinations thereof communicate or are coupled to a network, said network selected from the group consisting of a wired network, a wireless network, an Internet, and a cellular network.

16. The leak management system according to claim 1, wherein each of said plurality of substance flow sensor includes an authentication signature code.

17. The leak management system according to claim 16, wherein the authentication signature code is at least one of the group consisting of an IP address, a serial number, and combinations thereof.

18. The leak management system according to claim 1, wherein said alerts are selected from the group consisting of audible alarms, visual alarms, email messages transmitted to system users, text messages transmitted to system users, and combinations thereof.

19. The leak management system according to claim 1, wherein said distribution system is a piping system in a building and said substance is one of the group consisting of water, a non-water fluid, and a gas.

20. The leak management system according to claim 1, further comprising:
an antenna.

21. The leak management system according to claim 1, wherein a location of said at least one processor is selected from the group consisting of at one of said plurality of substance flow sensors, remote from said plurality of substance flow sensors, and combinations thereof.

22. The leak management system according to claim 1, said processor executable instructions further comprising:
if the device is a sensor device, presenting the device information to a user via the at least one user interface for optional verification of the device information by the user.

23. A leak management system for a substance flowing in a distribution system comprising:
a plurality of water flow sensors coupled to or in communication with said substance distribution system;
at least one processor coupled to or in communication with said plurality of water flow sensors;
at least one memory coupled to or in communication with said at least one processor;
at least one user interface coupled to or in communication with said at least one processor;
a primary power supply coupled to or in communication with said at least one processor;
a substance flow shutoff attached to said substance distribution system and coupled to or in communication with said at least one processor;
processor executable instructions configured to be executed by said at least one processor and stored in said at least one memory, the processor executable instructions including:
discovering said plurality of substance flow sensors;
monitoring operational status signals transmitted by each of said plurality of substance flow sensors;
receiving substance flow data from said plurality of substance flow sensors;
analyzing said substance flow data to identify at least one discrepancy;
transmitting an alert upon identification of said at least one discrepancy; and
activating said substance flow shutoff upon identification of said at least one discrepancy;

wherein discovering said plurality of substance flow sensors includes the steps of:
  discovering IP addresses of devices in the leak management system;
  compiling a list of the IP addresses;
  comparing each of the IP addresses to a register to obtain device information, the device information including whether the device associated with the IP address is a sensor device or a non-sensor device; and
  updating the list with the device information.

24. The leak management system according to claim 23, said processor executable instructions further comprising:
  if the device is a sensor device, presenting the device information to a user via the at least one user interface for optional verification of the device information by the user.

25. A method for managing leaks in a substance distribution system comprising the steps of:
  discovering a plurality of substance flow sensors coupled to or in communication with said distribution system;
  monitoring operational status signals transmitted by each of said plurality of substance flow sensors;
  receiving substance flow data from said plurality of substance flow sensors;
  analyzing said substance flow data to identify at least one discrepancy;
  transmitting at least one alert upon identification of said at least one discrepancy; and
  activating a water flow shutoff attached to said distribution system upon identification of said at least one discrepancy;
  wherein discovering said plurality of substance flow sensors includes the steps of:
    discovering IP addresses of devices in the leak management system;
    compiling a list of the IP addresses;
    comparing each of the IP addresses to a register to obtain device information, the device information including whether the device associated with the IP address is a sensor device or a non-sensor device; and
    updating the list with the device information.

26. The method for managing leaks in a substance management system according to claim 25, further comprising the steps of:
  if the device is a sensor device, presenting the device information to a user via the at least one user interface for optional verification of the device information by the user.

* * * * *